United States Patent
Kawamata

(10) Patent No.: US 7,154,947 B2
(45) Date of Patent: Dec. 26, 2006

(54) COINCIDENCE DETECTION APPARATUS AND METHOD

(75) Inventor: Naoki Kawamata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/414,333

(22) Filed: Apr. 15, 2003

(65) Prior Publication Data

US 2003/0194034 A1    Oct. 16, 2003

(30) Foreign Application Priority Data

Apr. 16, 2002   (JP)   ............................... 2002-113628

(51) Int. Cl.
 H03K 7/04   (2006.01)
(52) U.S. Cl. ............................... 375/239; 327/3; 702/150
(58) Field of Classification Search ................ 375/239; 327/3; 702/150
 See application file for complete search history.

(56) References Cited

U.S. PATENT DOCUMENTS 5,191,336 A * 3/1993 Stephenson ................ 341/111

6,327,319 B1 * 12/2001 Hietala et al. ............... 375/374
6,470,292 B1 * 10/2002 Tanaka et al. ............... 702/150

\* cited by examiner

*Primary Examiner*—Temesghen Ghebretinsae
*Assistant Examiner*—Juan Alberto Torres
(74) *Attorney, Agent, or Firm*—Morgan & Finnegan LLP

(57) ABSTRACT

This invention is to allow accurate high-speed coincidence detection while preventing any increase in circuit scale. To achieve this object, a coincidence detection apparatus includes a detector which outputs at least two periodical signals in accordance with the displacement of an object, a digital interpolator which processes the periodical signal output from the detector at a predetermined time interval to generate a displacement or angle at a period shorter than the period of the periodical signal, a pulse generation unit which generates a constant frequency pulse signal, a counter which counts the pulse signal output from the pulse generation unit, and a pulse conversion unit which calculates a value to be set in the counter from the difference between displacement information corresponding to the target position of the object and the output from the digital interpolator.

14 Claims, 6 Drawing Sheets

-- Prior Art --

COINCIDENCE DETECTION APPARATUS AND METHOD

FIELD OF THE INVENTION

The present invention relates to an apparatus and method of outputting a coincidence signal when a moving or rotating object passes a predetermined position or angle.

BACKGROUND OF THE INVENTION

Conventionally, apparatuses which move or rotate an object and, when the object passes a predetermined position or angle, output a coincidence signal are known. These apparatuses detect a displacement or an angle by an electrostatic capacitance sensor or an encoder.

An electrostatic capacitance sensor outputs direct displacement or angle information continuously. Hence, the information can be converted into, e.g., a voltage value to directly compare the current position or angle of the object with the predetermined position or angle.

When an encoder is used, the original period or zero-crossing of the encoder is counted, and accordingly, the current position or angle of an object can be directly compared with a predetermined position or angle.

For an accurate application purpose, the original period is interpolated to increase the resolution.

Conventionally, an analog interpolation scheme has been used for these application purposes.

In the analog interpolation scheme, a periodical signal is output continuously. Hence, when the periodical signal is counted, the current position or angle of an object can be compared with a predetermined position or angle.

In the analog interpolation scheme, the periodical signal of an encoder is converted into a period shorter than the original period.

FIG. 6 is a view for explaining the prior art by exemplifying an encoder.

A 2-phase output 2 is output from an encoder 1 as an object moves or rotates. The 2-phase output 2 contains sinusoidal-wave-shaped signals 90° out of phase. The 2-phase output 2 is electrically processed by an analog interpolator 30 to generate some periodical signals 31 in one period. In this example, one period is interpolated into four parts.

The analog interpolator continuously outputs a signal in accordance with the movement. This signal is counted by a counter 6 to obtain a signal 32. When a target 9 of coincidence detection is at the Nth pulse, a coincidence detection signal is output at a timing 11.

As described above, when the output from the analog interpolator is counted, coincidence detection can be done at the resolution of the analog interpolator.

However, for more accurate coincidence detection, e.g., to increase the number of interpolation parts to 1,000 or more, the analog interpolation scheme requires a larger circuit scale that is difficult to implement because of cost and labor for signal adjustment.

In addition, in the analog interpolation scheme, the final resolution is counted. For this reason, if the number of interpolation parts is increased, the number of digits of the counter increases. Furthermore, even when the speed is unchanged, the frequency increases in proportion to the resolution. Accordingly, the counter itself must increase the speed.

As described above, the analog interpolation scheme has two problems.

To solve these problems, a digital interpolator (scheme) which interpolates a period by digital signal processing has been proposed.

A digital interpolator is constituted by an analog/digital converter and a digital signal processing section. Hence, even when the number of interpolation parts is increased, the circuit scale does not increase.

When the digital interpolator is combined with a control unit, and the performance in the stationary state is required by a positioning unit, the digital interpolator can be used like an analog interpolator.

However, the digital interpolator obtains displacement or angle information for every sampling and therefore cannot obtain information between sampling.

This is inconvenient for accurate coincidence detection.

SUMMARY OF THE INVENTION

The present invention has been made in consideration of the above-described problems, and has as its object to allow accurate high-speed coincidence detection while preventing any increase in circuit scale.

In order to solve the above problems and achieve the above object, according to the first aspect of the present invention, there is provided a coincidence detection apparatus comprising a detector which outputs at least two periodical signals in accordance with one of a displacement and an angle of an object, a digital interpolator which processes the periodical signal output from the detector at a predetermined time interval to generate one of a displacement and an angle at a period shorter than a period of the periodical signal, a pulse generation unit which generates constant frequency pulses, a counter which counts a pulse signal output from the pulse generation unit, and a pulse conversion unit which converts a difference between displacement information corresponding to a target position of the object and an output from the digital interpolator into a pulse of the pulse generation unit.

In addition, according to the second aspect of the present invention, there is provided a coincidence detection method comprising a detection step of causing a detector which outputs at least two periodical signals in accordance with one of a displacement and an angle of an object to detect a displacement of the object, a digital interpolation step of causing a digital interpolator which processes the periodical signal output in the detection step at a predetermined time interval to generate one of a displacement and an angle at a period shorter than a period of the periodical signal to process the periodical signal, a pulse generation step of causing a pulse generation unit to generate constant frequency pulses, a count step of causing a counter which counts a pulse signal output in the pulse generation step to count the pulse signal, and a pulse conversion step of converting a difference between displacement information corresponding to a target position of the object and an output from the digital interpolator into a pulse of the pulse generation unit.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will be described below.

(First Embodiment)

Figure 1:
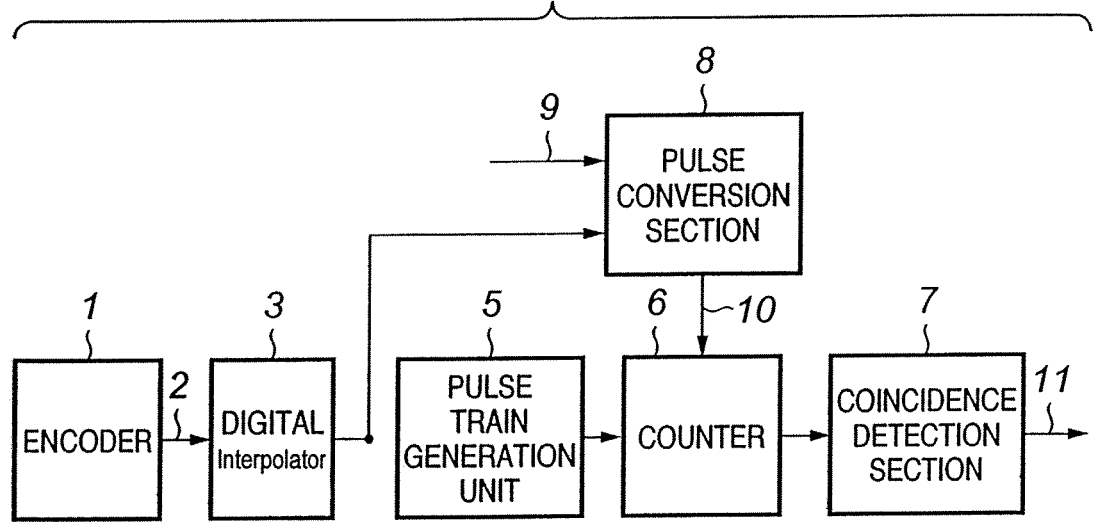
FIG. 1 is a view showing the first embodiment of the present invention.
Figure 1:
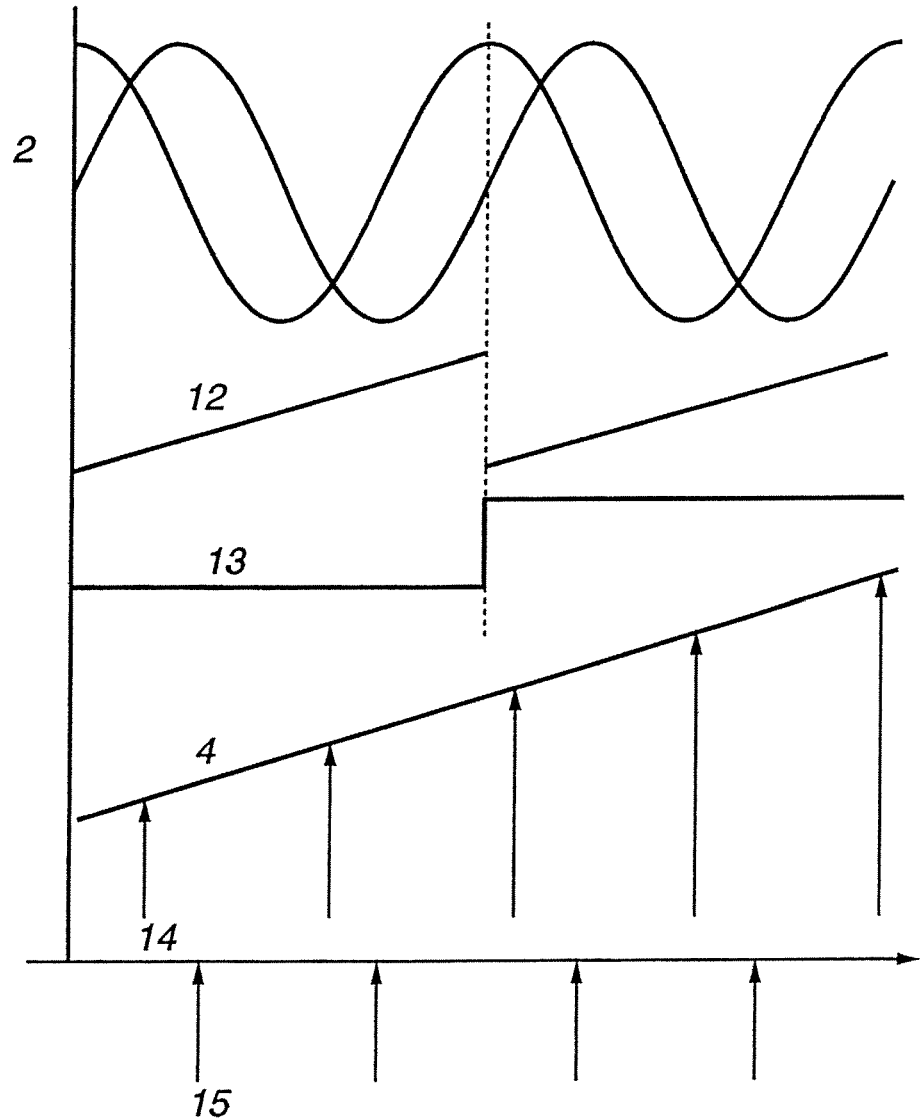

FIG. 1 is a view showing the arrangement of a coincidence detection apparatus according to the first embodiment of the present invention.

Figure 6:
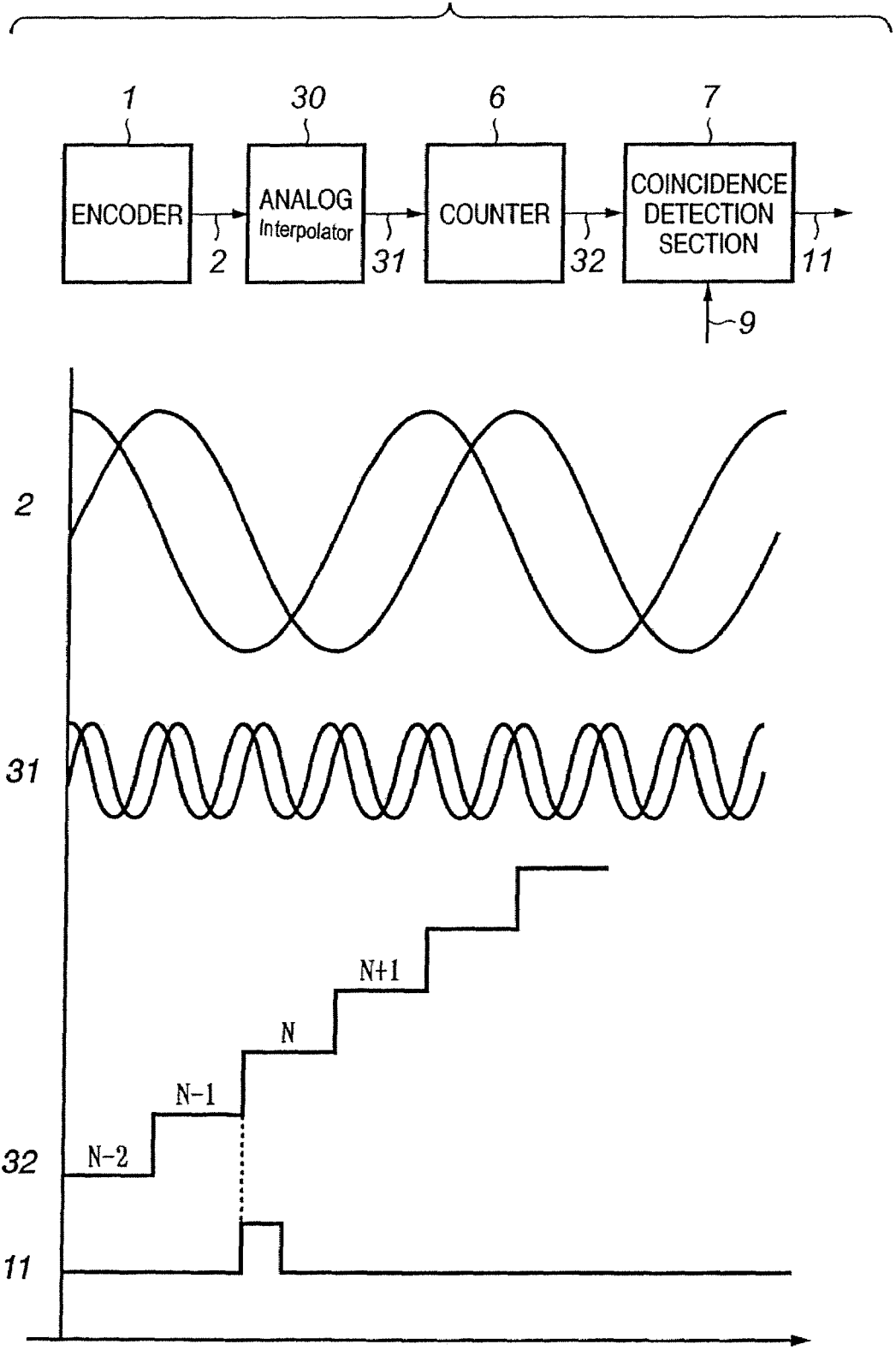
FIG. 6 is a view showing a prior art.

The same reference numerals as in the prior art shown in FIG. 6 denote the same functional parts in FIG. 1.

Referring to FIG. 1, reference numeral 1 denotes an encoder; 2, an output from the encoder; 3, a digital interpolator; 4, an output signal from the digital interpolator; 5, a pulse train generation unit; 6, a counter; 7, a coincidence detection section; 8, a pulse conversion section; 9, a target position information signal for coincidence detection; 10, a counter setting information signal; and 11, a coincidence signal.

The operation of the digital interpolator 3 will be described first.

As an object moves or rotates, the encoder 1 outputs the 2-phase periodical signal 2.

The digital interpolator 3 calculates a value corresponding to the inverse tangent function of the signal 2. This becomes a triangular wave 12 for every period of the encoder signal 2. In addition, the original period is counted to obtain a stairwise signal 13.

When the two signals are combined, the signal 4 representing the final displacement or angle after interpolation is obtained.

For example, when the period is interpolated into 1,000 parts, the triangular wave takes a value from 0 to 999, and the weight of count of the original period is set to 1,000 and added.

These processing operations are executed by a combination of an analog/digital converter and a digital signal processing circuit. The signal 4 is not continuously output. Instead, the signal 4 is output for every sampling, i.e., at timings indicated by arrows 14. The height of the arrow 14 at each timing corresponds to the output of the interpolation value. The interpolation value between two adjacent arrows 14 is unknown.

Actually, a digital signal processing time is required to calculate the interpolation value. Hence, the output from the digital interpolator becomes usable at a timing 15 with a predetermined delay from the timing 14.

Figure 2:
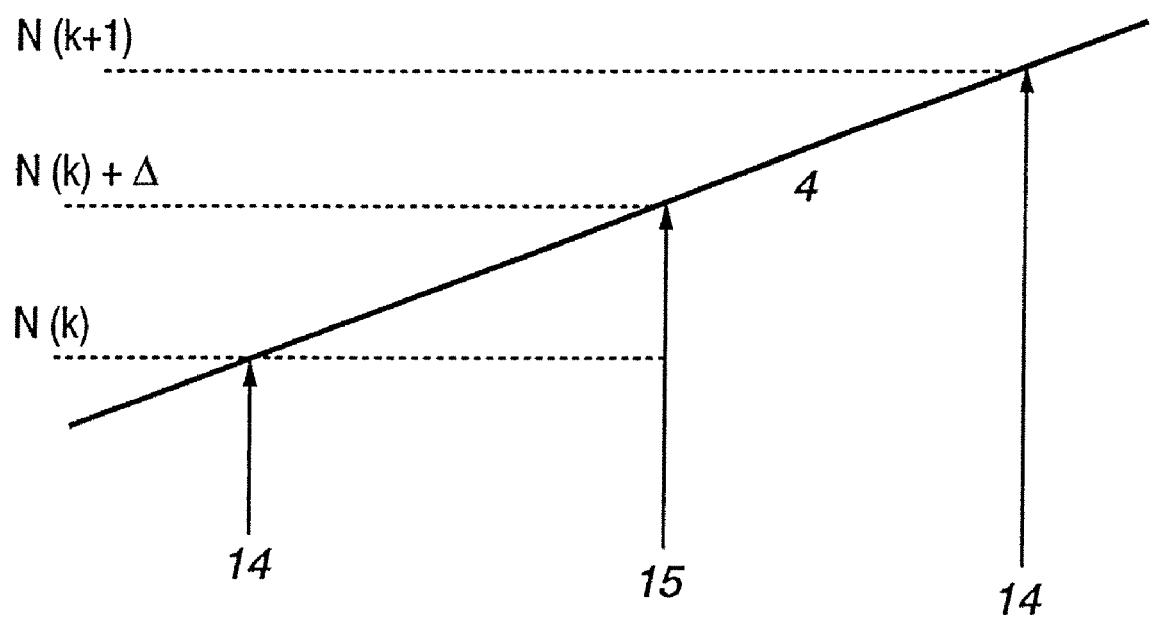
FIG. 2 is a graph for explaining the processing time of a digital interpolator.

This relationship will be described with reference to FIG. 2. Referring to FIG. 2, the abscissa represents time, and the ordinate represents the moving amount of the displacement or angle.

In FIG. 2, 4 indicates a moving amount of the object with respect to time, 14 indicates a sample point whose position is represented by N(k), and k indicates the kth sample point 14.

The time from 14 to 15 is the processing time delay for digital interpolation, and N(k) is calculated at the time 15.

Since the object moves by $\Delta$ during the calculation time delay, the position at the time 15 is given by $N(k)+\Delta$.

When the speed of the object is almost constant, the value $\Delta$ can be regarded almost constant independently of the sample point.

The pulse generation unit 5 in FIG. 1 only needs to generate a constant frequency pulse. The pulse can be generated on the basis of a clock signal of a digital circuit. Reference numeral 6 denotes the counter; and 7, the coincidence detection section.

When coincidence detection is to be executed, the object is moved or rotated at a predetermined speed by a control unit (not shown). Since the sampling interval is known, the number of pulses corresponding to the moving displacement or angle during sampling is known in advance. The number of pulses is defined as M. The number of pulses to be generated by the pulse generation unit during sampling is defined as Np.

Referring to FIG. 2, the difference between the position N(k) of the kth sample point and the position N(k+1) of the (k+1)th sample point corresponds to M.

When digital interpolation is to be performed, the control unit also generally executes digital processing using a digital interpolation value. At this time, as the digital signal processing section can commonly be used, the circuit scale does not increase.

The counter 6 can count up to the capacity of at least two samples, i.e., twice the value Np.

The digital interpolator 3 can output the displacement or angle for every sample point 14 at the timing of the phase comparison signal 15.

Since the moving speed can be regarded almost constant, the number of pulses corresponding to the movement from 14 to 15 can be calculated.

Setting the value of the counter 6 will be described with reference to the flow chart shown in FIG. 3.

Figure 3:
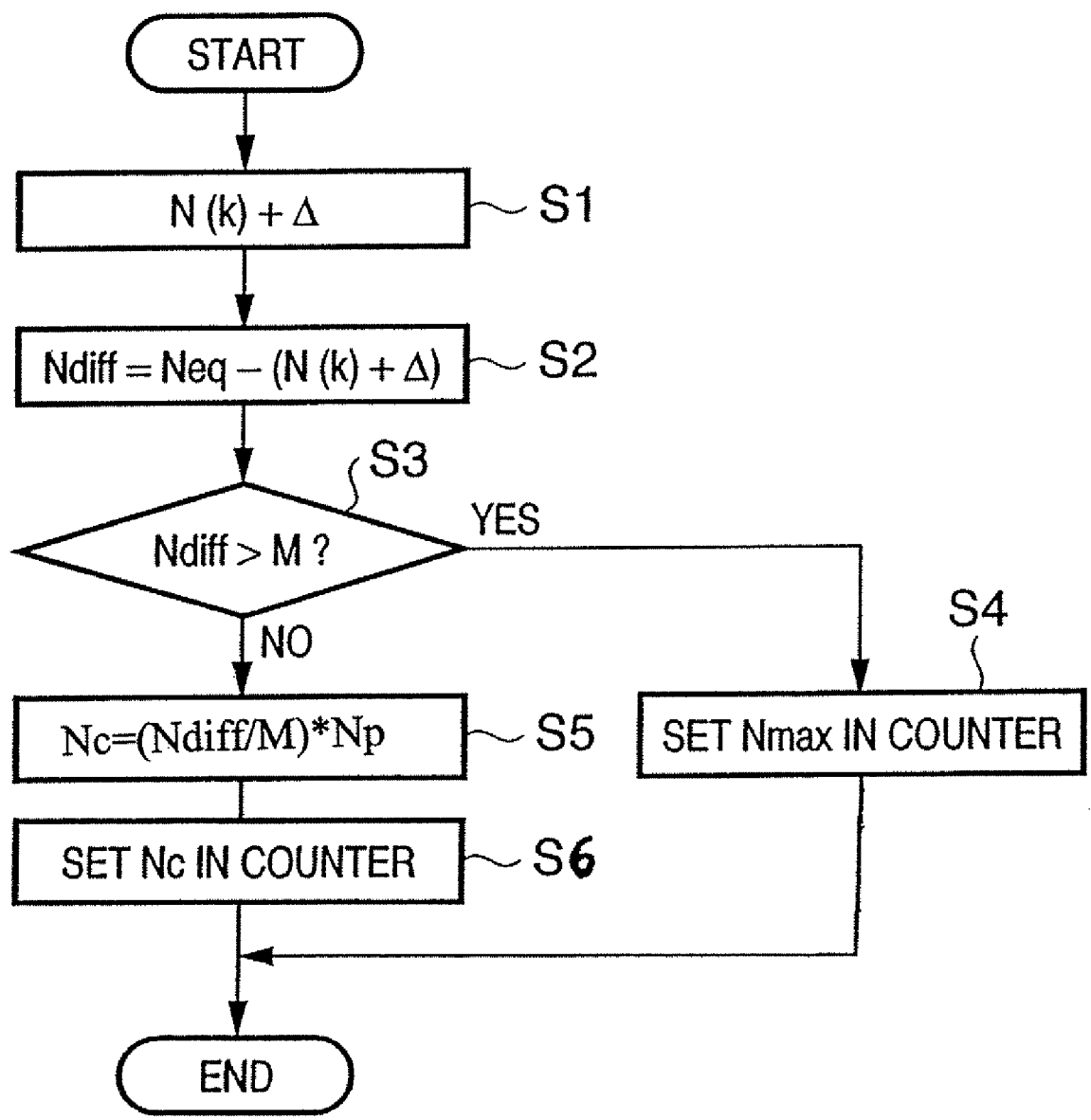
FIG. 3 is a flow chart for explaining a differential calculation procedure.

Referring to FIG. 3, Neq is the target position of coincidence detection, N(k) is the position pulse in kth sampling, $\Delta$ is the number of pulses corresponding to movement during the calculation time, Ndiff is the difference from the target position, and Nmax is the maximum value of the counter.

The difference between the number of pulses and the target pulse of coincidence detection is calculated at the timing 15 shown in FIGS. 1 and 2.

Step S1: The position pulse $N(k)+\Delta$ at the timing 15 is calculated.

Step S2: The difference Ndiff from the target pulse is calculated.

Step S3: It is determined whether Ndiff exceeds the number M of pulses for movement between sample times.

Step S4: If Ndiff exceeds the number M, the maximum value Nmax is set in the counter.

Step S5: If Ndiff is smaller than the number M, Ndiff is converted into the number Nc of pulses of the pulse generation unit.

Conversion Formula

Nc=(Ndiff/M)*Np

Step S6: The value is set in the counter 6.

The counter 6 counts such that the number of pulses from the pulse generation unit 5 is subtracted from the set value Nc.

The temporary relationship between the counter value and the coincidence detection section 7 will be described with reference to FIGS. 4A and 4B.

The abscissa represents time, and the ordinate represents the counter value.

The counter value is set to Nmax or Nc at the timing 15.

Figure 4A:
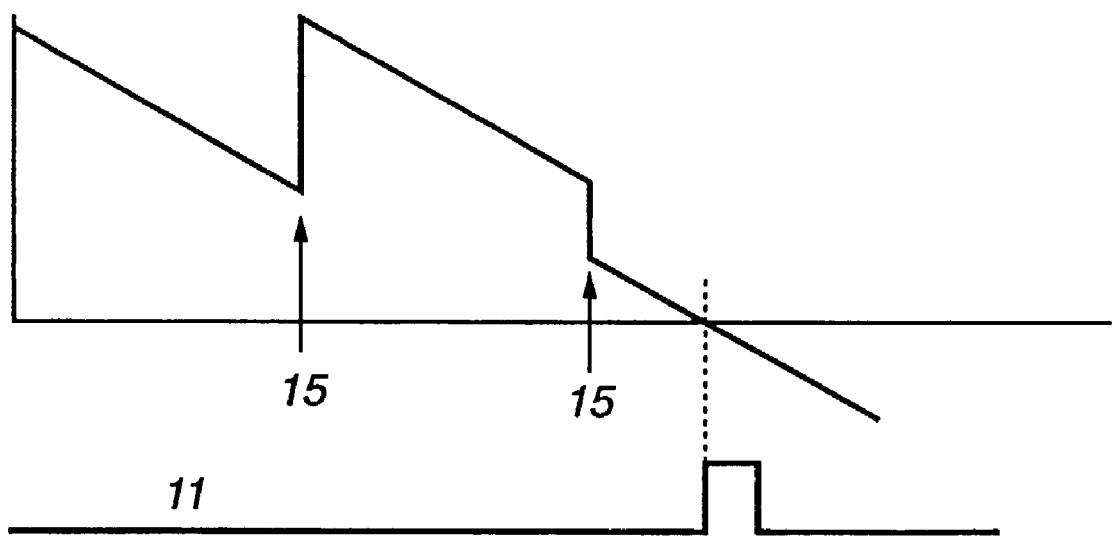
FIGS. 4A and 4B are charts for explaining coincidence detection according to the embodiment of the present invention.

In FIG. 4A, Nc is a positive value. A coincidence detection signal is output when the difference becomes zero.

Figure 4B:
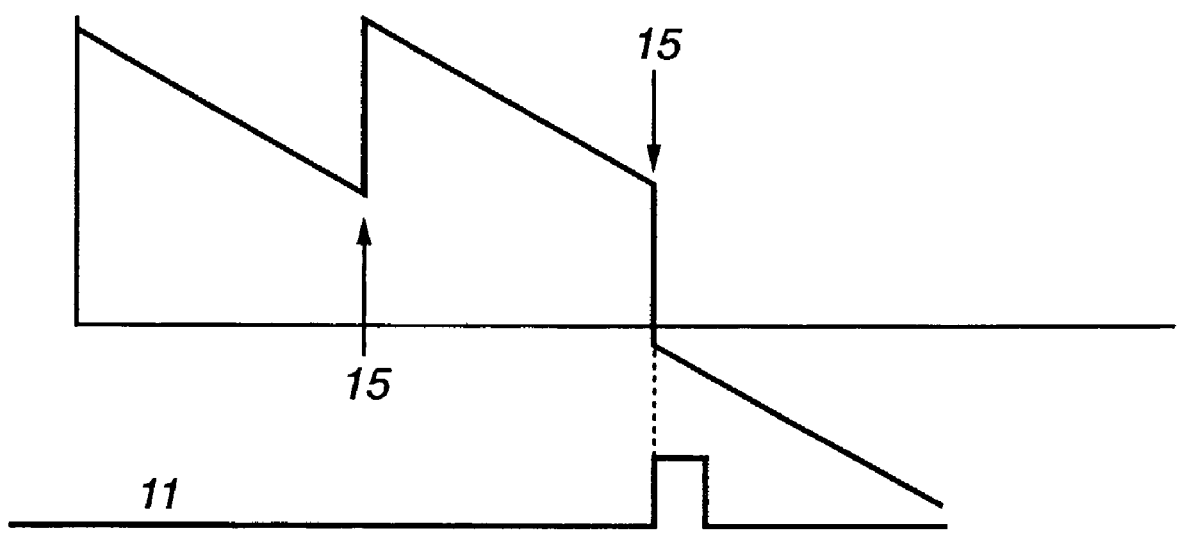

In FIG. 4B, Nc is a negative value. At this time, a coincidence detection signal is outpour at the timing 15.

At this time, the coincidence signal has a time difference. However, since the resolution per pulse is much higher than that in the analog interpolation method, the displacement error or angle error can be regarded to be very small.

In the above description, the moving speed or rotation speed of the object is assumed to be almost constant. If the speed changes, the number M is increased or decreased at the timing 15 in accordance with the increase or decrease in the number of movement or rotation pulses for every sampling.

(Second Embodiment)

In the first embodiment, the pulse generation unit has a predetermined frequency. The same processing as described above can be executed even when the pulse generation unit is replaced with an element which generates a pulse having an arbitrary frequency.

Figure 5:
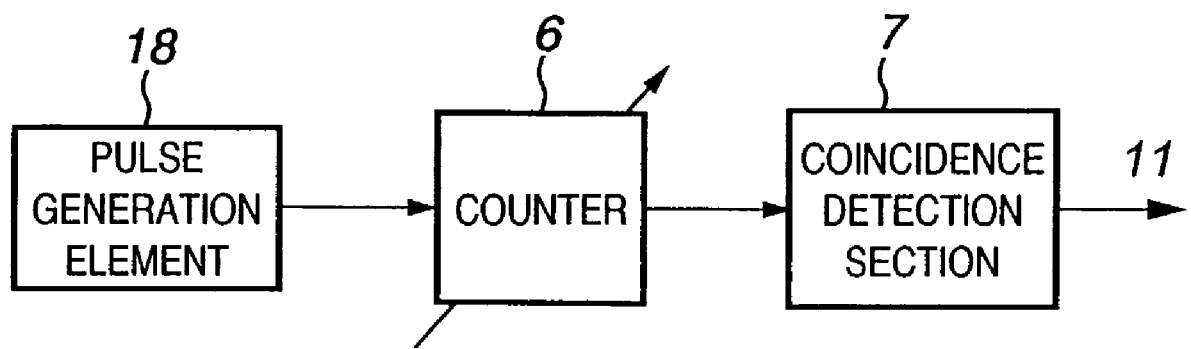
FIG. 5 is a block diagram for explaining the second embodiment of the present invention.

FIG. 5 shows the second embodiment.

Reference numeral 18 denotes a pulse generation element. The remaining components are the same as in the first embodiment.

In the first embodiment, the value to be set in the counter is converted from the difference between the target value and the outpour from the digital interpolator. The conversion can be omitted by making N match with Np.

"In the second embodiment, the pulse train generation unit has been described as an independent element. Currently, however, an element such as "Field Programmable Gate Array (FPGA)" whose function can be programmed has been developed. When such an element is used, the pulse train generation function and another function (e.g., the counter) can also be implemented in one element."

As described above, according to the embodiments, accurate and immediate coincidence detection can be performed by counting a constant frequency pulse train and comparing with preset value based on a discrete interpolator output.

In addition, since the number of digits of the counter can be decreased, any increase in counter circuit scale or processing circuit scale can be prevented.

As described above, according to the embodiments, accurate high-speed coincidence detection can be executed while preventing any increase in circuit scale.

The present invention is not limited to the above embodiments and various changes and modifications can be made within the spirit and scope of the present invention. Therefore, to apprise the public of the scope of the present invention, the following claims are made.

What is claimed is:

1. A coincidence detection apparatus comprising:
   a detector which outputs at least two periodical signals in accordance with one of a displacement and an angle of an object;
   a digital interpolator which processes the periodical signal output from said detector at a predetermined time interval to generate one of a displacement and an angle at a period shorter than a period of the periodical signal;
   a pulse generation unit which generates constant frequency pulses;
   a counter which counts a pulse signal output from said pulse generation unit; and
   a pulse conversion unit which converts a difference between displacement information corresponding to a target position of the object and an output from said digital interpolator into a pulse of said pulse generation unit.

2. The apparatus according to claim 1, wherein a value of said counter is updated every sampling.

3. The apparatus according to claim 2, wherein a timing for updating said counter and the updated value are a timing and value obtained by correcting a delay in processing time of said digital interpolator.

4. The apparatus according to claim 2, wherein said counter has a capacity corresponding to a multiple of the number of pulses generated in one sampling period,
   when the number of pulses corresponding to a difference between a current position and the target position of the object is larger than the number of pulses generated in one period, a value larger than the number of pulses generated in one period is set in said counter as an updated value,
   when the number of pulses corresponding to the difference between the current position and the target position of the object is smaller than the number of pulses generated in one period, the number of pulses corresponding to the difference between the current position and the target position is set in said counter as the updated value,
   when the set value set in said counter is a positive value, a coincidence detection signal is output when the number of pulses from said pulse generation unit is subtracted from the set value, and the difference becomes zero, and
   when the set value is one of zero and a negative value, the coincidence detection signal is immediately output.

5. The apparatus according to claim 1, wherein said pulse generation unit is formed from a pulse generation element having a variable frequency, and a value of said counter is updated every sampling.

6. The apparatus according to claim 5, wherein, a timing for updating said counter and the updated value are a timing and value obtained by correcting a delay in processing time of said digital interpolator.

7. The apparatus according to claim 5, wherein said counter has a capacity corresponding to a multiple of the number of pulses generated in one sampling period,
   when the number of pulses corresponding to a difference between a current position and the target position of the object is larger than the number of pulses generated in one period, a value larger than the number of pulses generated in one period is set in said counter as an updated value,
   when the number of pulses corresponding to the difference between the current position and the target position of the object is smaller than the number of pulses generated in one period, the number of pulses corresponding to the difference between the current position and the target position is set in said counter as the updated value, when the set value set in said counter is a positive value, a coincidence detection signal is output when the number of pulses from said pulse generation unit is subtracted from the set value, and the difference becomes zero, and when the set value is one of zero and a negative value, the coincidence detection signal is immediately output.

8. A coincidence detection method comprising: a detection step of causing a detector which outputs at least two periodical signals in accordance with one of a displacement and an angle of an object to detect a displacement of the object;

a digital interpolation step of causing a digital interpolator which processes the periodical signal output in the detection step at a predetermined time interval to generate one of a displacement and an angle at a period shorter than a period of the periodical signal to process the periodical signal;

a pulse generation step of causing a pulse generation unit to generate constant frequency pulses;

a count step of causing a counter which counts a pulse signal output in the pulse generation step to count the pulse signal; and a pulse conversion step of converting a difference between displacement information corresponding to a target position of the object and an output from the digital interpolator into a pulse of the pulse generation unit.

9. The method according to claim 8, wherein a value of the counter is updated every sampling.

10. The method according to claim 9, wherein a timing for updating the counter and the updated value are a timing and value obtained by correcting a delay in processing time of the digital interpolator.

11. The method according to claim 9, wherein the counter has a capacity corresponding to a multiple of the number of pulses generated in one sampling period, when the number of pulses corresponding to a difference between a current position and the target position of the object is larger than the number of pulses generated in one period, a value larger than the number of pulses generated in one period is set in the counter as an updated value, when the number of pulses corresponding to the difference between the current position and the target position of the object is smaller than the number of pulses generated in one period, the number of pulses corresponding to the difference between the current position and the target position is set in the counter as the updated value, when the set value set in the counter is a positive value, a coincidence detection signal is output when the number of pulses of the pulse generation unit is subtracted from the set value, and the difference becomes zero, and when the set value is one of zero and a negative value, the coincidence detection signal is immediately output.

12. The method according to claim 8, wherein the pulse generation unit is formed from a pulse generation element having a variable frequency, and a value of the counter is updated every sampling.

13. The method according to claim 12, wherein a timing for updating the counter and the updated value are a timing and value obtained by correcting a delay in processing time of the digital interpolator.

14. The method according to claim 12, wherein the counter has a capacity corresponding to a multiple of the number of pulses generated in one sampling period, when the number of pulses corresponding to a difference between a current position and the target position of the object is larger than the number of pulses generated in one period, a value larger than the number of pulses generated in one period is set in the counter as an updated value, when the number of pulses corresponding to the difference between the current position and the target position of the object is smaller than the number of pulses generated in one period, the number of pulses corresponding to the difference between the current position and the target position is set in the counter as the updated value, when the set value set in the counter is a positive value, a coincidence detection signal is output when the number of pulses from the pulse generation unit is subtracted from the set value, and the difference becomes zero, and when the set value is one of zero and a negative value, the coincidence detection signal is immediately output.

* * * * *